United States Patent

[11] 3,581,578

| | | |
|---|---|---|
| [72] | Inventor | Wilfred C. Schuemann<br>Rawlings Heights, Rawlings, Md. |
| [21] | Appl. No. | 830,828 |
| [22] | Filed | June 5, 1969 |
| [45] | Patented | June 1, 1971 |
| [73] | Assignee | Hercules Incorporated<br>Wilmington, Del. |

[54] JET ADJUSTMENT MEANS FOR FLUID JET DEFLECTION TYPE INSTRUMENTS
6 Claims, 3 Drawing Figs.

| | | |
|---|---|---|
| [52] | U.S. Cl. | 73/515 |
| [51] | Int. Cl. | G01p 15/00 |
| [50] | Field of Search | 73/505,<br>515, 516; 137/81.5; 33/204 |

[56] References Cited
UNITED STATES PATENTS

| | | | |
|---|---|---|---|
| 1,841,607 | 1/1932 | Kollsman | 73/180 |
| 3,310,985 | 3/1967 | Belsterling et al. | 73/515 |

*Primary Examiner*—James J. Gill
*Assistant Examiner*—Herbert Goldstein
*Attorney*—William F. Smith

ABSTRACT: An instrument wherein the deflection of a fluid jet, induced for example by the angular movement of the instrument, produces a signal proportional to the deflection, and particularly, such an instrument having means for adjusting the jet into a centered condition relative to the sensing means. The means herein disclosed comprises a plurality of adjusting elements such as setscrews that are turned down to provide an obstruction in the flow path of the fluid to the jet nozzle, the adjusting elements being located adjacent to and symmetrically about the nozzle inlet.

PATENTED JUN 1 1971 3,581,578

WILFRED C. SCHUEMANN
INVENTOR

BY *William J. Smith*

AGENT

JET ADJUSTMENT MEANS FOR FLUID JET DEFLECTION TYPE INSTRUMENTS

This invention relates to a fluid jet deflection type instrument, that is, an instrument wherein a fluid jet is adapted to be deflected from a centered condition relative to a sensing means, the magnitude and the direction of the deflection being measured to produce an output signal to indicate the magnitude and direction of the force or influence inducing the deflection.

An example of a fluid jet deflection type instrument is the angular movement sensing device forming the subject matter of copending U.S. Pat. application Ser. No. 632,239, filed Apr. 20, 1967, now U.S. Pat. No. 3,500,691 dated Mar. 17, 1970. In this device the deflection of a laminar flow fluid jet from a centered condition relative to the sensing means is produced by the lateral movement of the sensing means during the interval of time that an increment of fluid is in transit in the jet from the nozzle to the sensing means, and the amount and direction of the deflection is an indication of the rate and the direction of the angular movement. A further example of a fluid jet deflection type instrument is the gravity- or acceleration-sensitive instrument included in the subject matter of copending U.S. Pat. application Ser. No. 830,826, filed June 5, 1969.

In a fluid jet deflection type instrument such as that disclosed in the above-noted application Ser. No. 830,826, the sensing means comprises a pair of thermistors spaced from the jet nozzle and spaced apart relative to the jet axis to position them on opposite sides of the centerline of the jet in the area radially of the axis of the jet where there is substantially linear variation in the jet velocity. Thus, when the jet is deflected relative to the thermistors, the increase or decrease of the jet velocity over each of them is directly proportional to the magnitude of the jet deflection. In an instrument wherein the jet nozzle is about one-eighth of an inch in diameter, the jet velocity is about 100 inches per second, and the spacing of the origin of the jet at the exit of the nozzle to the sensing means is about one-half of an inch, the total deflection of the jet over the full scale of the instrument would be about 1 millimeter. It is important to the accuracy of such an instrument that the jet be centered relative to the sensing means when the instrument is in the at rest condition, that is, when the jet is not deflected.

There are various sources of error which would cause the jet to deviate from a centered condition relative to the sensing means, for example, the axis of the nozzle may vary laterally or angularly, or the posts for supporting the thermistors may be skewed or laterally displaced relative to the designed jet axis, all within the normal range of manufacturing tolerances. The position of the thermistors on the end of their supports may also vary minutely. These or other factors may cause the jet to impinge upon the sensing means in a noncentered relation in the at rest condition of the instrument. There is thus an unequal cooling effect upon the thermistors, which will produce an output signal indistinguishable from that of a jet deflection. To a limited extent, this erroneous signal can be damped by a zeroing adjustment of the instrument. However, with the very small dimensions involved, many of the adverse effects of a noncentered jet cannot be effectively damped. For example, the thermistors may be operating outside the range of linear variation of the jet velocity if they were not centered relative to the jet, or the cooling effect upon the two thermistors may be varied nonuniformly when the axis of the jet is normally displaced above or below the plane of sensitivity and the cross section of the jet in the plane of sensitivity does not pass through the axis of the jet.

In accordance with the above, it is an object of this invention to provide a centering adjustment for the jet in a fluid jet deflection type instrument, and particularly for an instrument such as that forming the subject matter of the above-noted application Ser. No. 830,826. Further objects of this invention are to provide such an adjustment which is simple and inexpensive, will not materially alter the operation of the instrument, and is trouble free and durable.

The above objects have been achieved by the use of a plurality, preferably four, adjustment screws that are equally spaced angularly about the intake end of the nozzle and have the leading ends thereof inserted into the flow path of the fluid to the nozzle. In this manner, an adjustment of the fluid input circumferentially of the nozzle is effected to deflect the jet relative to the axis of the nozzle. After adjustment of the jet into a centered relation relative to the sensing means, the adjusting screws are preferably locked in their adjusted position.

With the above and other objects in view, a preferred embodiment of the present invention is hereinafter disclosed with reference to the accompanying drawings, in which.

Figure 1:
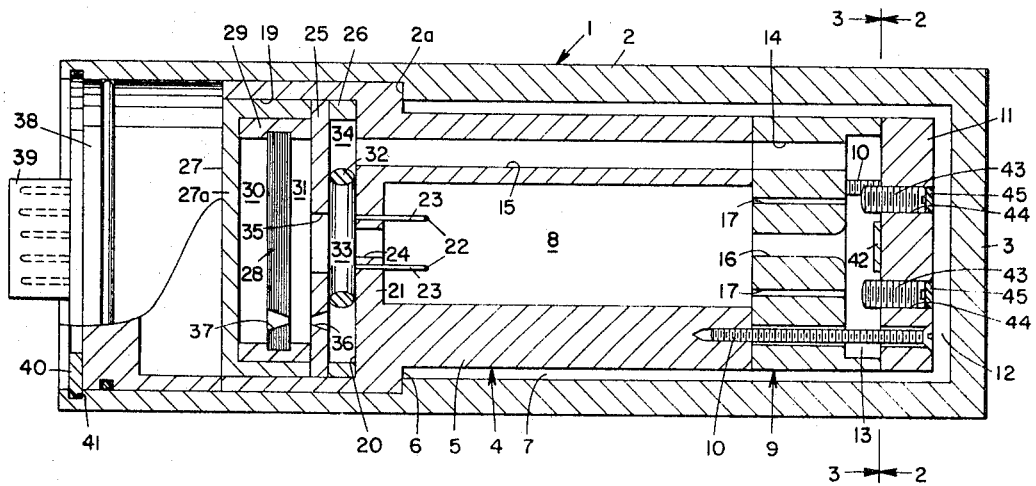
FIG. 1 is a sectional view longitudinally of an instrument embodying the present invention.

With reference to the drawings, there is illustrated a fluid jet deflection type instrument comprising a housing 1 including a cylindrical sidewall 2 having internally thereof a shoulder 2a and closed at one end by an end wall 3. A unit 4 is inserted into the housing 1 from the open end thereof, the unit 4 comprising a body 5 having a shoulder 6 that is adapted to be seated against the shoulder 2a for positioning the unit 4 endwise of the housing 1. From the shoulder 6 outwardly to the open end of the housing 1, the body 5 has an external diameter that is adapted to be received within the sidewall 2 with a relatively close fit for supporting the body 5. The body 5 is preferably secured within the housing 1 as by an adhesive applied at the opposed supporting surfaces. Inwardly of the housing 1 from the shoulder 6, the external diameter of the body 5 is smaller than the internal diameter of the sidewall 2 whereby that portion of the body 5 is supported in cantilever fashion relative to the housing 1 to provide an annular space 7 therebetween.

The body 5 has a cylindrical jet chamber 8 extending inwardly axially thereof from the end adjacent the end wall 3 of the housing 1. A nozzle member 9 is secured to the nozzle end of the body 5 by screws 10 that extend through an end plate 11 and the nozzle member 9 and are threaded into the body 5. The screws 10 are arranged radially outwardly of the body 5 from and about the periphery of the jet chamber 8, and there are preferably three of the screws 10 equally spaced angularly about the axis of the unit 4. The external diameter of the nozzle member 9 and end plate 11 is comparable to that of the adjacent portion of the body 5 whereby they are spaced inwardly from the housing 1 to continue the annular space 7. The body 5, nozzle member 9, and end plate 11 are dimensioned lengthwise relative to the housing 1 to space the end plate 11 from the end wall 3 to provide a clearance space 12 therebetween.

Figure 2:
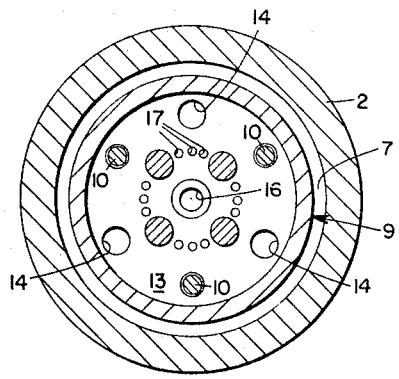
FIG. 2 is a transverse sectional view taken substantially on the line 2–2 of FIG. 1.
Figure 3:
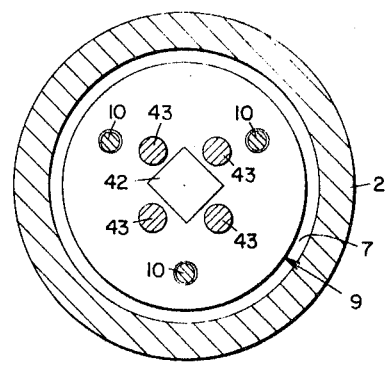
FIG. 3 is a sectional view taken substantially on the line 3–3 of FIG. 1.

The nozzle member 9 is formed with a cavity extending axially inwardly from the end thereof adjacent to the end plate 11 to provide a plenum chamber 13 between the bottom of the cavity and the adjacent face of the end plate 11. Fluid is supplied to the plenum chamber 13 by a plurality of fluid inlets 14 in the form of bores in the nozzle member 9, each of which inlets 14 is open at one end into the plenum chamber 13 and is connected at the other end to a bore 15 aligned axially with the inlets 14, the bore 15 being formed endwise of the body and spaced radially from the axis of the unit 4 outwardly of the jet chamber 8. There are preferably three of the inlets 14 and bores 15 equally spaced angularly about the axis of the unit 4 intermediate the screws 10, as can be seen in FIG. 2.

A nozzle 16 is formed in the nozzle member 9 with the inlet end thereof open into the plenum chamber 13 and the output end thereof open into the jet chamber 8. The nozzle 16 is arranged to direct a fluid jet endwise of the jet chamber 8 substantially along the axis thereof, or in other words, is aligned axially with the jet chamber 8. A plurality of vents 17 are formed through the nozzle member 9 between the plenum chamber 13 and the jet chamber 8. The vents 17, which are disclosed and claimed in U.S. Pat. application Ser. No. 632,238, surround the nozzle 16 and function to introduce fluid into the jet chamber 8 in the space surrounding the jet, thereby preventing a cyclical or counterflow of fluid in the jet chamber 8 in the space surrounding the jet, which counterflow is induced by aspiration by the jet. At the same time, by supplying fluid from the same sources to both the jet and the jet-surrounding space in the jet chamber 8, there is substantially eliminated any temperature or density differential between the fluids which would make the device gravity or acceleration sensitive.

The body 5 is provided with a cavity 19 extending axially inwardly thereof from the end opposite from the nozzle end of the jet chamber 8. The cavity 19 terminates at a bottom wall 20 that is spaced from the bottom wall of the jet chamber 8 by a partition 21. The sensing means of the instrument, which consists of a pair of thermistors 22, is secured as by an adhesive to the free ends of a pair of glass rods or posts 23 mounted and adhesively secured in bores in the partition 21. The thermistors 22 are substantially centered relative to the axis of the nozzle 16 and are spaced apart a distance that is gauged relative to the cross section of the jet at this point whereby they are disposed on opposite sides of the center of the jet discharged from the nozzle 16. When the jet is deflected, the fluid passing over the thermistors will increase or decrease depending upon whether the center of the jet is moved toward or from the respective thermistor. The partition 21 is also provided with a plurality of exhaust ports 24, only one of which is shown in FIG. 1, which ports 24 are disposed symmetrically relative to the thermistors 22 for exhausting the fluid from the jet chamber 8 with a minimum of turbulence. The posts 23 serve to space the thermistors 22 from the partition 21 so that the jet will flow smoothly relative thereto.

A pump means is disposed in the cavity 19 of the body 5, which pump means includes an orifice plate 25 that is positioned in spaced relation relative to the bottom wall 20 of the cavity 19 by a ringlike spacer 26. The pump means also includes a cup-shaped end piece 27 having an end wall 27a that closes the end of the cavity 19, and a pump plate 28 that is mounted between and in spaced relation to the end wall 27a and the orifice plate 25 by a spacer 29. The pump plate 28 is mounted in an internal groove in the spacer 29 which, for assembly purposes, may be resilient so that it can be deformed over the edge of the pump plate 28. The spacer 29 also serves to hold the pump plate 28 without confining it too severely and thus inhibiting the vibration thereof. By way of example, the spacer 29 may be made of a relatively hard rubber. The various elements are preferably secured adhesively in their assembled relation.

The space between the end wall 27a and the pump plate 28 constitutes a pump chamber 30 while the space between the pump plate 28 and the orifice plate 25 constitutes an intake chamber 31. The space between the orifice plate 25 and the bottom wall 20 of the cavity 19 is separated by a divider in the form of an O-ring 32 into a centrally located exhaust chamber 33 and an annular pressure chamber 34 surrounding the same. The orifice plate is provided at the center thereof with an exhaust opening 35 interconnecting the exhaust chamber 33 and the intake chamber 31. The orifice plate 25 is also provided with an outlet orifice 36 adjacent the periphery thereof that interconnects the intake chamber 31 and the pressure chamber 34. The pump plate 28 is provided with a pump orifice 37 that is directly opposed across the inlet chamber 31 from the outlet orifice 36 of the orifice plate 25.

The illustrated pump means, which is like that forming the subject matter of U.S. Pat. application Ser. No. 830,830, filed June 5, 1969, comprises a pair of laminated disclike piezoelectric crystals which are adapted to be energized by voltage of opposite polarity whereby when the one crystal is expanded, the other is contracted. The pump plate 28 is thus caused to buckle with the contracting crystal at the concave side and the expanding crystal at the convex side. When the polarity of the voltage on the crystals is reversed, the pump plate 28 buckles in the opposite direction. The crystals are adapted to be energized by an oscillator (not shown) which periodically reverses the voltage to the crystals, for example, at a frequency of 2,800 cycles per second.

As the pump plate 28 buckles to enlarge the volume of the pump chamber 30, fluid is drawn into the pump chamber from the intake chamber 31 through the orifice 37. As the pump plate 28 buckles to decrease the volume of the pump chamber 30, a charge of air is expelled through the pump orifice 37. This charge of air has sufficient energy to carry across the intake chamber 31 and through the outlet orifice 36 into the pressure chamber 34. The orifices 36 and 37 are preferably oriented angularly intermediate a pair of the bores 15. Thus, the charge of air impinges on a blank face at the wall 20 and is dispersed throughout the pressure chamber 34 to move uniformly through the bores 15 and inlets 14 into the plenum chamber 13. From the plenum chamber 13, the fluid passes through the nozzle 16 and vents 17 into the jet chamber 8. After passing endwise of the jet chamber 8 over the thermistors 22, the fluid is exhausted through the ports 24 into the exhaust chamber 33 and from the exhaust chamber 33 through the exhaust opening 35 into the inlet chamber 31 from which it is drawn by the pump and recirculated.

The open end of the housing 1 is closed by an end cap 38 including an electrical connection 39, which cap 38 is secured in the housing 1 by an expansion ring 40 that cooperates with a groove 41 internally of the housing 1. The electrical components of the instrument, that is, the thermistors 22 and pump plate 28, are wired to the connector 39 which provides for connecting them externally to an appropriate electrical circuit which may be, for example, of the type disclosed and claimed in the above-noted application Ser. No. 632,239. Briefly, this circuit comprises a bridge circuit for heating each of the thermistors to a temperature at which the resistance of the thermistors will produce equilibrium in the respective bridge circuit and the power supplied to each of the thermistors will be sufficient only to replace the heat that is lost by dissipation. When the jet is deflected, the rate at which the heat is dissipated from the respective thermistor increases or decreases, depending upon whether the axis of the jet moved toward or away from the thermistor. When the thermistor cools, the resistance thereof drops so that the bridge becomes unbalanced and more power is delivered to the thermistor to reheat it to the equilibrium temperature of the bridge. Conversely, when the cooling rate of the thermistor is decreased, the temperature of the thermistor increases and its resistance increases, so that its bridge circuit is unbalanced and the power to the thermistor is reduced until its temperature falls to its equilibrium temperature at the new cooling rate. By comparing the bridge voltages of the two bridges, the cooling rate of the jet on the two thermistors and thus the lateral position of the jet relative to the two thermistors can be determined. The reaction time of the circuit is almost instantaneous to provide a continuous indication of the jet position.

In the operation of the instrument, the jet that is discharged by the nozzle 16, travels endwise of the jet chamber 8 and impinges upon the thermistors 22. When the jet is centered relative to the thermistors 22, the cooling imposed upon each of the thermistors is substantially equal. When the jet is deflected, it will have an increased or decreased cooling effect upon the thermistors. Deflection of the jet occurs in an angular movement sensing instrument when the thermistors are displaced laterally during the time that a particular increment of jet fluid is in transit from the nozzle to the thermistors from their positions at the time the increment of jet fluid was discharged by the nozzle. Thus, this increment of jet fluid will engage the thermistors in a noncentered condition, with the amount and direction of the displacement from the centered condition indicating the direction and the angular rate of the turn.

Deflection of the jet occurs in a gravity- or acceleration-sensing instrument by imparting buoyancy, either positive or negative, to the jet relative to the surrounding fluid in the jet chamber 8. Such a buoyancy may be provided by the means forming the subject matter of U.S. Pat. application Ser. No. 830,827, filed June 5, 1969. Briefly, the means therein disclosed comprises a minute electrical heater 42, which may be a conventional patch-type strain gauge that is secured to the inner face of the end plate 11 in the area opposed to the inlet of the nozzle 16. The fluid flowing from the inlets 14 into the plenum chamber 13 and then to the nozzle 16, passes over the heater 42, while the fluid to the vents 17 does not significantly pass over the heater 42. Thus the temperature of the nozzle fluid is raised a finite amount relative to that of the vent fluid and the jet will thus have a predetermined buoyancy relative to the surrounding fluid. The jet will therefore be deflected by acceleration in the plane of sensitivity, that is, in a direction at right angles to the jet in a plane defined by the axis of the nozzle 16 and the two thermistors 22.

In order to achieve a linear response in the reading or signal produced, it is necessary that the thermistors 22 be disposed symmetrically relative to the axis of the jet in its nondeflected condition and be disposed in the area radially of the jet in which there is substantially linear variation in the jet velocity. As pointed out in the above-noted application Ser. No. 632,239, the thermistors are thus located in a plane of sensitivity that includes the axis of the jet and on opposite sides of the jet axis, with each of the thermistors centered in an area ranging from about 40 percent to 70 percent of the jet diameter from the jet axis. If the jet were not initially centered in this manner, the range of one or both of the thermistors in the jet profile may extend outside the area of linear variations in the jet velocity. The same results may occur if the jet axis were to either side of the plane of sensitivity and the lateral dimension of the jet in the plane of sensitivity thereby reduced.

A noncentered condition of the jet relative to the thermistors 22 may result, for example, from deviation of the jet from the designed jet axis, which may in turn be caused by manufacturing variations in the lateral position of the nozzle 16 or the angularity of it relative to the axis of the jet chamber 8. There may also be variations in the position of the posts 23 laterally relative to the axis of the jet chamber 8, or in the parallelism of the axis if the posts 23 relative to the axis of the jet chamber, or in the location of the thermistors 22 on the end of the posts 23. All of the above variations may be within reasonable manufacturing tolerances and may be prohibitively expensive to eliminate in manufacturing.

In accordance with this invention, means are provided for correcting any deviations of the jet from a centered condition relative to the sensing means by inserting adjustable flow obstructions in the flow path of the fluid through the plenum chamber 13 to the nozzle 16. The illustrated means comprises a plurality of setscrews 43 threaded through bores 44 in the end plate 11. There are preferably four of the setscrews 43 disposed with the axes thereof substantially parallel to the axis of the nozzle 16, and arranged equally spaced both angularly about the axis of the nozzle 16 and radially therefrom. The setscrews 43 are preferably spaced radially from the axis of the nozzle 16 a distance that is not significantly greater than the radial spacing of the vents 17 and are spaced angularly between a pair of the vents 17 so that when the screws are turned down to project the ends thereof into the plenum chamber 13, their ends will constitute obstructions in the flow path of the fluid through the plenum chamber 13 to the nozzle 16 but will not materially obstruct fluid flow to the vents 17. Adjusting the screws 43 so that the ends thereof project more or less into the plenum chamber alters the dynamics of the flow or fluid feed to the nozzle, thereby deflecting the jet relative to the axis of the nozzle.

The unit 4 is normally assembled and finally closed in a controlled atmosphere so that it will contain a predetermined volume of fluid. The assembled unit 4 is then placed on a test stand at which temporary test connections are made to the leads to the pump plate 28 and to the thermistors 22. The unit is then operated without deflection of the jet while the screws 43 are adjusted to center the jet relative to the thermistors and to bring the axis thereof into the plane of sensitivity. When the adjustment is completed, the screws 43 are locked in their adjusted position, for example, by depositing and setting an epoxy resin in the bores 44 above the screws 43 to provide a locking plug 45. The unit 4 is then inserted into and adhesively secured in the housing 1, the electrical connections from the pump plate 28, thermistors 22 and heater 42 are made to the connector 39, and the end cap 38 inserted into the housing 1 and secured by the ring 40. Sealing the housing 1 by the end cap 38 is also preferably done in a controlled atmosphere so that the housing 1 will contain a predetermined volume of fluid. The unit is then adapted to use by connecting the same by the connector 39 to an external circuit for supplying power to the unit and for comparing the heat dissipation of the thermistors 22.

The preferred fluid in the unit 4 and housing 1 is air but other fluids, for example helium, may be used and in some instances may be preferred.

By way of example, an instrument in accordance with this invention may comprise a nozzle 16 that is one-eighth of an inch in diameter. The thermistors 22 may be spaced from the nozzle a distance that may be, for example, as little as one-half an inch, the actual spacing being a function primarily of the jet velocity and the desired range or sensitivity of the instrument. With the thermistors spaced, for example, a distance of about one-half inch from a one-eighth inch nozzle, the thermistors are spaced apart a distance of about a little over one-eighth of an inch to place them on opposite sides of the centerline of the jet in the area radially of the jet where there is a substantially linear variation in the jet velocity. The posts 23 in such an arrangement are preferably about one-tenth of an inch high. The fluid pressure at the plenum chamber 13 is about 0.0005 p.s.i., which will maintain a jet velocity with air of about 100 inches per second and a flow rate of less than 2 cubic feet per hour. The Reynolds number of the fluid at the nozzle is between 400 and 1,000 to provide laminar flow in the jet. The heater 42 is designed to maintain a temperature differential of about 2° or 3° F. between the fluid at the nozzle and at the bores 17.

What I claim and desire to protect by Letters Patent is:

1. A fluid jet deflection type instrument comprising:
    a body having a jet chamber,
    nozzle means having a nozzle for directing a fluid jet endwise of said jet chamber,
    sensing means disposed in said jet chamber remote from said nozzle and symmetrically relative to the axis thereof and adapted to respond to deflection of a fluid jet from a centered condition relative thereto,
    said body having exhaust means beyond said sensing means from said nozzle for exhausting fluid from said jet chamber,
    means for supplying fluid under pressure to said nozzle including a plenum chamber having the intake end of said nozzle opening into the same and fluid inlet means for introducing fluid into said plenum chamber substantially symmetrically about the axis of said nozzle,
    and means for centering a fluid jet discharged by said nozzle onto said sensing means, said means comprising a plurality of elements extending into said plenum chamber between said nozzle and said inlets for obstructing the flow of fluid through said plenum chamber to said nozzle, and means for adjusting said elements individually for varying the obstruction provided by the same in the plenum chamber.

2. A fluid jet deflection type instrument in accordance with claim 1 in which said elements are adjustable endwise.

3. A fluid jet deflection type instrument in accordance with claim 2 in which said elements comprise screws.

4. A fluid jet deflection type instrument in accordance with claim 3 in which said elements are disposed on an axis parallel to the axis of said nozzle and are threaded through an end wall of said plenum chamber opposed to said nozzle.

5. A fluid jet deflection type instrument in accordance with claim 4 in which said inlets are arranged about the periphery of said nozzle and are open into said plenum chamber on the same side thereof as said nozzle.

6. A fluid jet deflection type instrument in accordance with claim 1 in which said sensing means comprises a pair of spaced thermistors.